United States Patent [19]
Yoshida et al.

[11] Patent Number: 5,912,774
[45] Date of Patent: *Jun. 15, 1999

[54] LENS MOVING MECHANISM FOR FINELY MOVING A PORTION OF AN OBJECTIVE LENS BY ROTATING A HOLDING MEMBER

[75] Inventors: Setsuo Yoshida, Yokohama; Satoshi Natsume, Sagamihara, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,849

[22] Filed: Jul. 25, 1996

[30] Foreign Application Priority Data

| Jul. 28, 1995 | [JP] | Japan | 7-193188 |
| Jul. 31, 1995 | [JP] | Japan | 7-194990 |
| Jul. 31, 1995 | [JP] | Japan | 7-195000 |

[51] Int. Cl.⁶ .................................... G02B 7/02
[52] U.S. Cl. ............................................. 359/823
[58] Field of Search ........................ 359/811, 813, 359/815, 819, 820, 821, 822, 823, 824, 825, 826

[56] References Cited

U.S. PATENT DOCUMENTS

| 3,851,952 | 12/1974 | Werz et al. ............... 350/187 |
| 3,930,720 | 1/1976 | Uesugi ...................... 350/187 |
| 4,576,460 | 3/1986 | Daitoku et al. ........... 354/400 |
| 4,834,514 | 5/1989 | Atsuta et al. ............. 350/429 |
| 4,929,073 | 5/1990 | La Plante et al. ........ 350/609 |
| 4,948,235 | 8/1990 | Akitake .................... 350/429 |
| 4,961,635 | 10/1990 | Kondo et al. ............ 350/429 |
| 5,032,859 | 7/1991 | Akimoto et al. .......... 354/195 |
| 5,140,357 | 8/1992 | Suda et al. ................. 354/40 |
| 5,438,190 | 8/1995 | Kaneda et al. ............ 359/698 |

FOREIGN PATENT DOCUMENTS

| 56-51164 | 5/1981 | Japan ...................... H04N 5/26 |
| 4-86729 | 3/1992 | Japan . |
| 7-128568 | 5/1995 | Japan . |

OTHER PUBLICATIONS

Patent Abstracts of Japan, vol. 95, No. 8 (JP 7–128568 (May 19, 1995)) Sep. 29, 1995.
Patent Abstracts of Japan, vol. 16, No. 309 (P–1382) (JP 4–86729 (Mar. 19, 1992)) Jul. 8, 1992.

*Primary Examiner*—Robert H. Kim
*Assistant Examiner*—Michael P. Stafira
*Attorney, Agent, or Firm*—Fitzpatrick, Cella, Harper & Scinto

[57] ABSTRACT

A lens moving mechanism for finely moving at least a lens portion of an objective lens in a direction of an optical axis of the objective lens. The lens moving mechanism includes a holding member holding the lens portion and a disc-like disc cam member provided with a cam surface, which lies in a peripheral portion of the disc-like disc cam member. The disc cam member is rotated to thereby move the holding member on a track conforming to the cam surface.

8 Claims, 14 Drawing Sheets

FIG. 16A
PRIOR ART
FIG. 16B
PRIOR ART
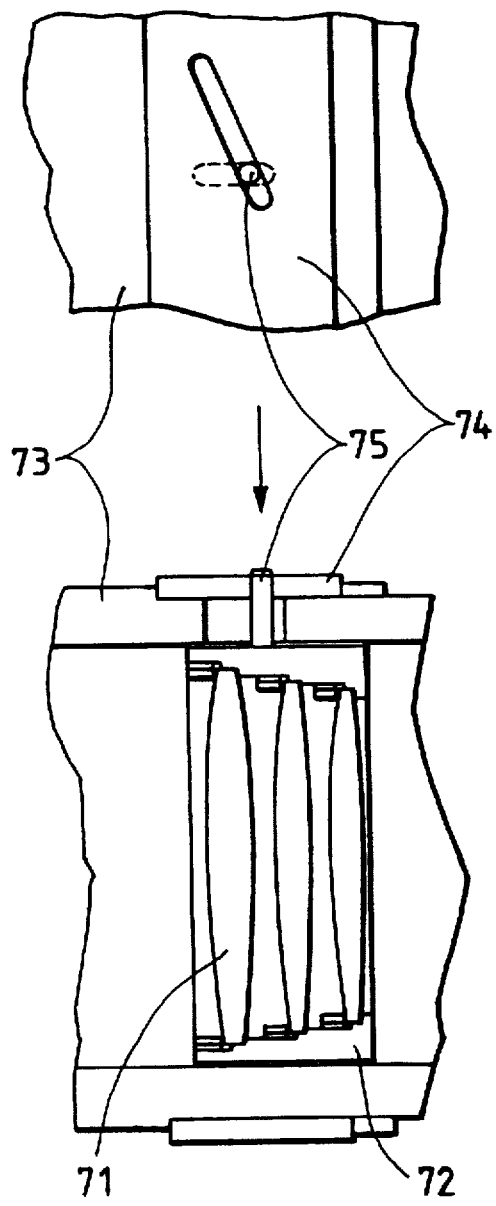
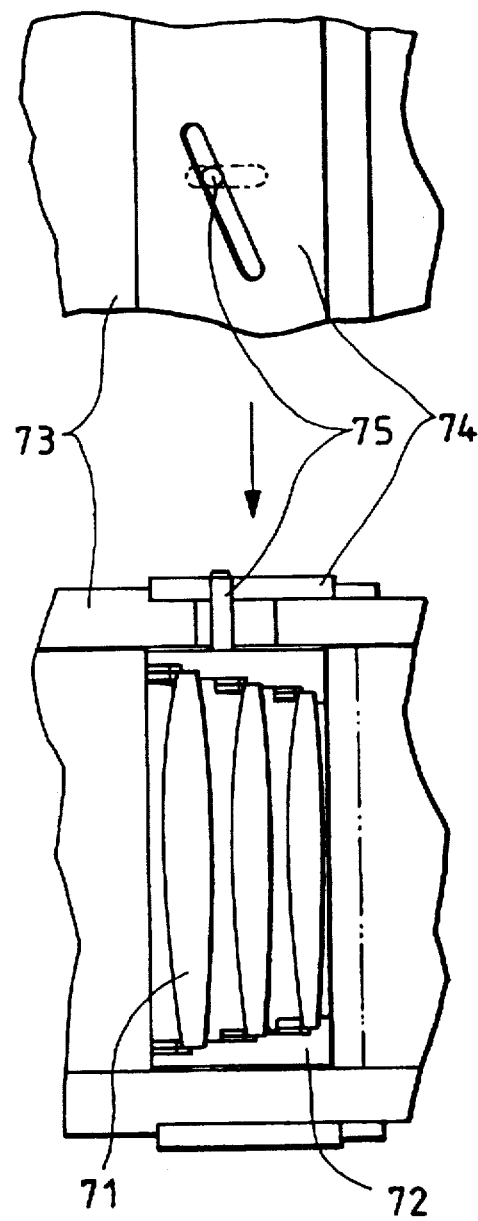

3,912,774

1

LENS MOVING MECHANISM FOR FINELY MOVING A PORTION OF AN OBJECTIVE LENS BY ROTATING A HOLDING MEMBER

BACKGROUND OF THE INVENTION

1. Field of the Invention

This invention relates to a lens moving mechanism suitable for a photo-taking lens with an auto focus function in which an optical lens unit is finely moved in the direction of the optical axis thereof to thereby effect the detection of an in-focus state.

2. Related Background Art

As the auto focus device of a video camera, there is known a so-to-speak mountain climbing system in which the degree of minuteness of a photographing image field is detected from a high frequency component in an image signal and the position of a lens is controlled so that the degree of minuteness may become maximum. This system is described in detail in Japanese Laid-Open Patent Application No. 56-51164, and this system will hereinafter be described briefly with reference to FIG. 6 of the accompanying drawings. In FIG. 6, the reference numeral 100 designates a lens, the reference numeral 101 denotes a signal processing portion, and the reference numeral 102 designates a motor.

The light of an object entering the lens 100 is converted into an electrical signal by the signal processing portion 101. By the utilization of the fact that the high frequency component of this electrical signal is small if the in-focus state of the lens 100 is insufficient, and becomes greater as the lens is more in focus, the signal processing portion 101 causes the converted electrical signal of an image pickup device to pass through a high-pass filter, whereafter it detects and integrates the electrical signal over a period during which an image field is formed, i.e., a field period (in the case of a television system, 1/60 sec.), and detects the state of the focus.

Then, a focus lens is moved by the motor so that a high frequency signal may be obtained, and there is obtained the in-focus state.

Now, when detecting the direction of out-of-focus, it is usually practiced to finely move (wobble) some lens in the photo-taking lens 100 in forward and backward directions along the optical axis thereof.

Heretofore, in such a zoom lens device, as a lens moving mechanism for finely moving a lens unit, use has usually been made of a system as shown in FIG. 7 of the accompanying drawings. In FIG. 7, the reference numeral 103 denotes a finely moved lens unit, the reference character 103a designates a holding member holding the lens 103, and the reference numeral 104 denotes the fixed portion (fixed barrel) of a lens device body. The lens holding member 103a is fitted in an aperture (not shown) formed in the fixed portion and is supported for rectilinear movement in the direction of the optical axis. The reference character 105a designates the external thread of a feed screw directly connected to the motor, and disposed parallel to the optical axis and engaged with an internal thread 103b provided on the lens holding member 103a.

Under such a construction, the lens 103 is finely moved by the rotational operation of a motor 105 and the in-focus direction is detected by the signal processing portion.

Now, in this system, out-of-focus is caused by the fine movement of the lens unit and therefore, in a lens device for photographing, and particularly a TV or video lens device

2 handling moving images, it is necessary to suppress the out-of-focus within a range in which a variation in an image signal is detectable and moreover to such a degree that it is not conspicuous to the eyes. Also, after the detection by wobbling, a focus lens unit is moved and therefore, to realize auto focus quick in response, it is important to effect the wobbling at high speed.

Here, the amount of variation in the focus by the wobbling is determined by the amount of movement of the lens unit 103, but the amount of movement of the lens unit 103 which satisfies the above-described condition is related to the depth of focus. That is, when the depth of focus is shallow, the variation in the focus will be conspicuous unless the amount of movement of the lens unit 103 is made small, and when the depth of focus is deep, the variation in the focus cannot be detected unless the amount of movement of the lens unit 103 is made great. On the other hand, the depth of focus greatly varies depending on the focal length of the zoom lens and the F value of the aperture, and the difference between the time when the depth of focus is deepest and the time when the depth of focus is shallowest is on the order of several tens of times. Accordingly, the amount of movement of the lens unit 103 by the wobbling must also be varied as much as several tens of times between the minimum and the maximum.

Heretofore, however, in the lens moving mechanism used for wobbling, use has been made of a feed screw in which the amount of feed relative to the rotation of the motor 105 is constant and therefore, it has been necessary to make the total number of revolutions of the feed screw for moving the lens unit small when the depth of focus is shallow, and very great when the depth of focus is deep. Therefore, to effect the wobbling when the depth of focus is deep, it has been necessary to rotate the motor a lot and thus, much time has been taken until the end of the wobbling and after all, this has led to the problem that the response of auto focus becomes slow. Conversely, if the lead of the feed screw is made great so that the lens unit can be moved quickly when the depth of focus is deep, the number of revolutions of the motor when the depth of focus is shallow becomes very small and therefore, it has become difficult to move the lens unit with good accuracy.

On the other hand, in the lens device for photographing, as a mechanism for moving a lens unit for optical tracking adjustment or the like in the direction of the optical axis thereof, use is made of one as shown in FIGS. 16A and 16B of the accompanying drawings. In these figures, the reference numeral 71 designates a movable lens unit, the reference numeral 72 denotes a lens holding member holding the lens 71, and the reference numeral 73 designates the fixed portion (fixed barrel) of a lens barrel body which corresponds to an outer cylinder, and the lens holding member 72 is fitted in an aperture formed in the fixed portion 73 and is rectilinearly movable in the direction of the optical axis. The reference numeral 74 denotes a ring member having a cam slot, and fitted to the outer periphery of the fixed portion 73 and rotatable about the optical axis. The reference numeral 75 designates a pin member mounted on the lens holding member, and fitted in a straight groove formed in the fixed portion 73 and the cam slot of the ring member 74.

In the construction as described above, when as shown in FIGS. 16A and 16B, the ring member 74 is manually rotated or electrically rotated by the use of a motor or the like, the pin member 75 moves along both of the cam slot of the ring member 74 and the straight groove of the fixed portion 73, and the lens holding member 72 on which the pin member 75 is mounted rectilinearly moves in the direction of the optical axis. The movable lens unit 71 is then rectilinearly moved in the direction of the optical axis, whereby the intended optical lens adjustment is achieved.

In the above-described example of the conventional art, however, the lens holding member 72 rectilinearly moves while frictionally sliding by the aperture in the fixed portion 73 and the fitted portion and therefore, for the lens holding member 72 to move smoothly with a small force, it is necessary that there be a suitable gap in the fitted portion between the lens holding member 72 and the fixed portion 73. This has led to the possibility that as shown in FIG. 17A of the accompanying drawings, the lens holding member 72 becomes eccentric or as shown in FIG. 17B of the accompanying drawings, an inclination is caused to the lens holding member 72 by backlash and the optical performance is deteriorated.

SUMMARY OF THE INVENTION

It is an object of the present invention to provide a lens moving mechanism which can easily follow any variation in the depth of focus of a photo-taking lens.

It is also an object of the present invention to prevent the occurrence of the eccentricity or inclination of a lens when the lens is moved.

The present invention provides a lens moving mechanism for finely moving a lens portion of a phototaking lens in the direction of the optical axis thereof, characterized by a holding member holding the lens portion, and a disc-like disc cam member provided with a cam surface, the disc cam member being rotated to thereby move the holding member on a track conforming to the cam surface.

Specifically, the disc cam member repeats forward rotation and reverse rotation about a predetermined axis and is rotatively controlled, and the cam surface is of a shape in which the distance from the axis becomes gradually longer or shorter.

It is also an object of the present invention to prevent the occurrence of the inclination or eccentricity of a movable lens caused by the movement in the direction of the optical axis thereof in the conventional art, and in the present invention, a holding member holding the lens is held relative to an outer cylinder by a disc-like resilient member so that the holding member may be pressed in the direction of the optical axis by a pressing member, and particularly, the resilient member is constructed of a metallic thin plate, whereby eccentricity in a direction perpendicular to the optical axis is suppressed even if the lens is moved in the direction of the optical axis.

BRIEF DESCRIPTION OF THE DRAWINGS

FIGS. 16A and 16B show the mechanism for moving a lens array such as an optical tracking adjusting mechanism.

DESCRIPTION OF THE PREFERRED EMBODIMENTS

Figure 4:
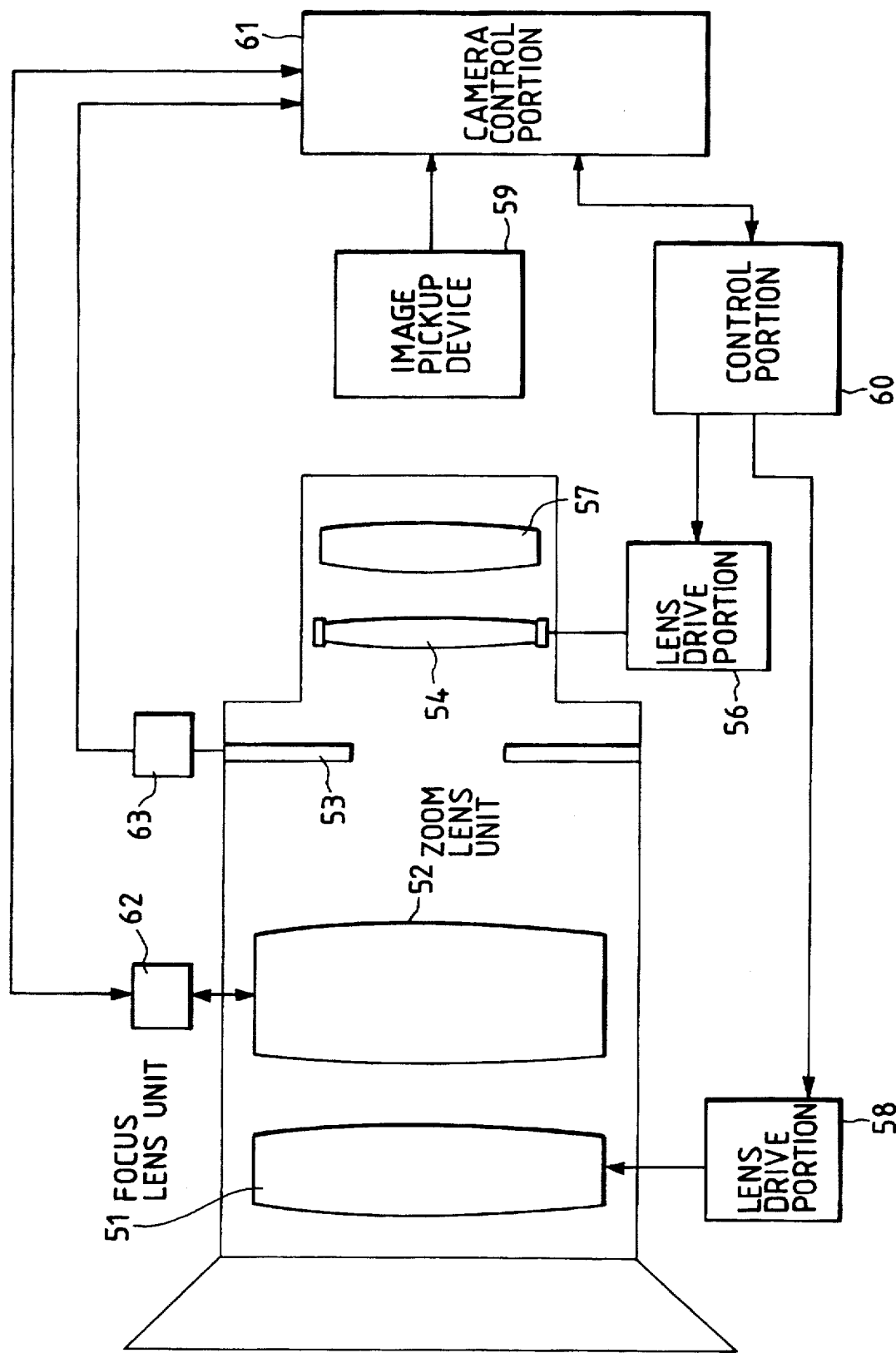
FIG. 4 is a block diagram of an entire camera carrying thereon the lens moving mechanism according to the present invention.

First, FIG. 4 shows the lens moving mechanism of the present invention. In FIG. 4, the reference numeral 51 designates a focus lens unit for focusing, the reference numeral 52 denotes a zoom lens unit for effecting a focal length change, the reference numeral 53 designates an aperture portion for adjusting exposure, the reference numeral 54 denotes a lens unit finely movable in the direction of the optical axis thereof to aid focus detection, the reference numeral 56 designates a lens drive portion for driving the lens, the reference numeral 57 denotes a relay lens unit having the imaging action, and the reference numeral 58 designates a lens drive portion for driving the focus lens unit 51. Each lens unit is comprised of a plurality of lenses. The reference numeral 59 denotes an image pickup device such as a CCD, the reference numeral 60 designates a control portion for controlling the lens drive portions 56 and 58 and performing the automatic focus function, and the reference numeral 61 denotes a circuit for causing the control of an entire camera to be executed. The reference numeral 62 designates a zoom lens drive portion and a lens position detecting portion. The reference numeral 63 denotes an aperture drive portion and an aperture position detecting portion.

In such a construction, the lens unit 54 for focus detection is designed such that even if it is finely moved in the direction of the optical axis, the image magnification thereof hardly varies and only the focus thereof is out. Accordingly, by the lens unit 54 being finely moved (wobbled) in the direction of the optical axis by the lens drive portion 56, the focus position on the image pickup surface of the image pickup device 59 is finely varied and this variation can be detected as a variation in an image signal. This signal variation is sent to the circuit 61 on the camera side and is signal-processed thereby, and the amount and direction of the out-of-focus are calculated and are outputted to the control portion 60. The control portion 60 outputs a drive signal conforming to the amount and direction of the out-of-focus, and the focus lens 51 is driven by the lens drive portion 58, whereby auto focus can be effected.

Figure 1A:
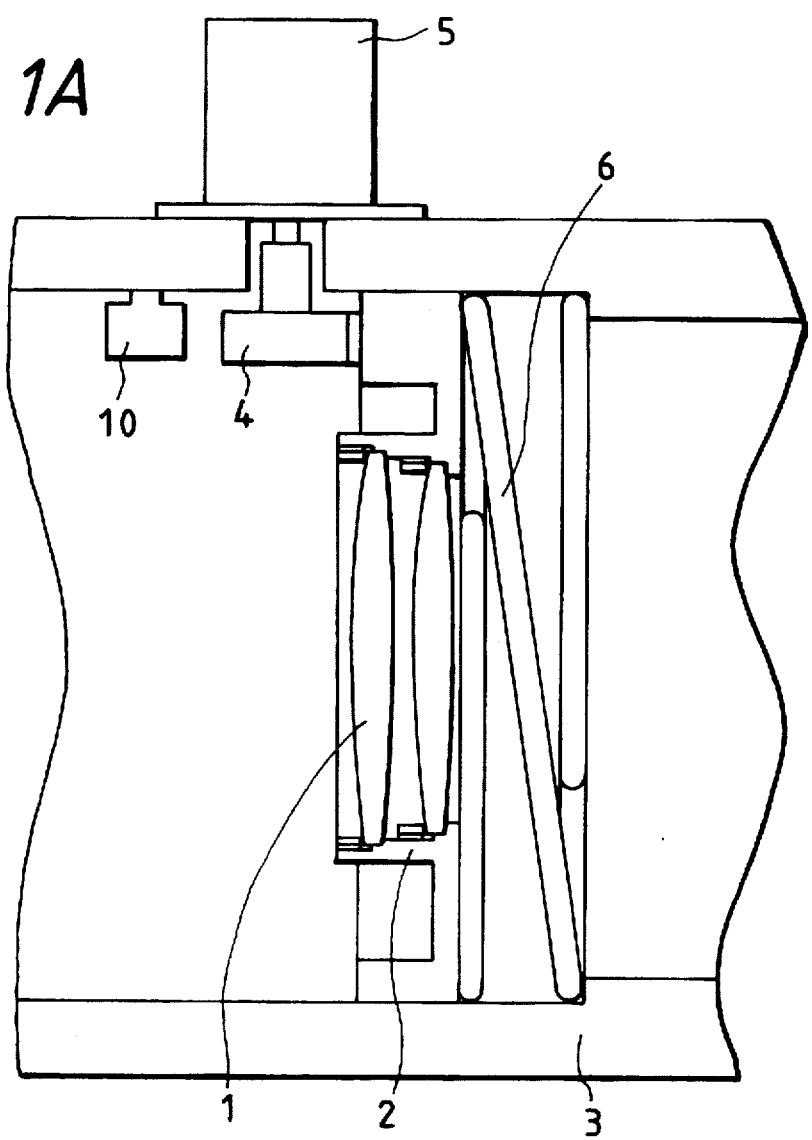
FIGS. 1A and 1B show a lens moving mechanism according to the present invention.
Figure 1B:
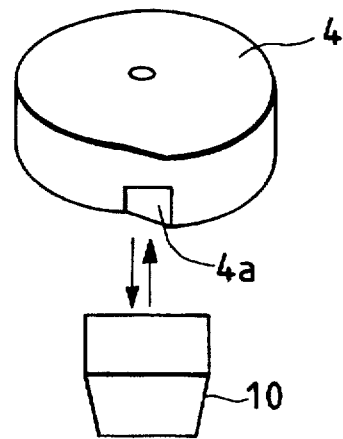

FIGS. 1A and 1B show the specific lens moving control mechanism 56, 54 shown in FIG. 4. In FIGS. 1A and 1B, the reference numeral 1 designates a finely movable lens portion (corresponding to the lens unit 54 in FIG. 4), and the reference numeral 2 denotes a holding member holding the lens portion 1 and fitted to a fixed portion 3 (fixed barrel) and movable in the direction of the optical axis. The reference numeral 4 designates a disc cam formed with a cam surface on the outer periphery thereof, and connected to the output shaft of a stepping motor 5 mounted on the fixed portion 3 and having its cam surface disposed so as to contact with the end surface of the lens holding member 2. The motor 5 is controlled so as to repeat forward rotation and reverse rotation.

Also, in FIGS. 1A and 1B, the disc cam 4 is directly connected to the output shaft of the motor 5, but alternatively may be connected to the output shaft through a speed reduction mechanism. The reference numeral 6 denotes a spiral member having a springy property and incorporated between the lens holding member 2 and the fixed portion 3 and biasing the holding member 2 so as to normally contact with the cam surface of the disc cam 4. The reference numeral 10 designates a photosensor which detects light reflected from a light reflecting portion 40 provided with the cam 4 to thereby detect the rotated position of the cam 4.

Figure 2B:
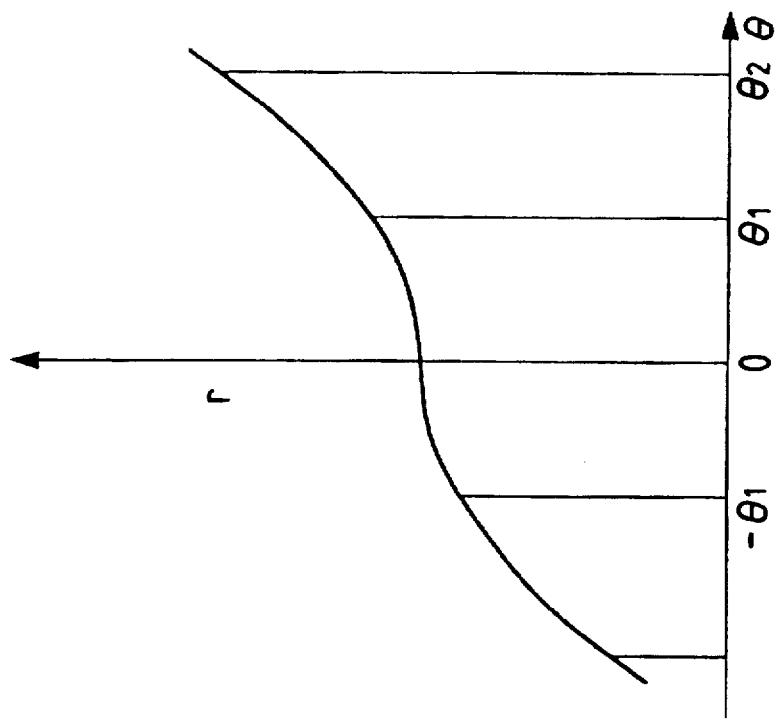
FIGS. 2A and 2B show the shape of a disc-like cam according to the present invention.
Figure 2A:
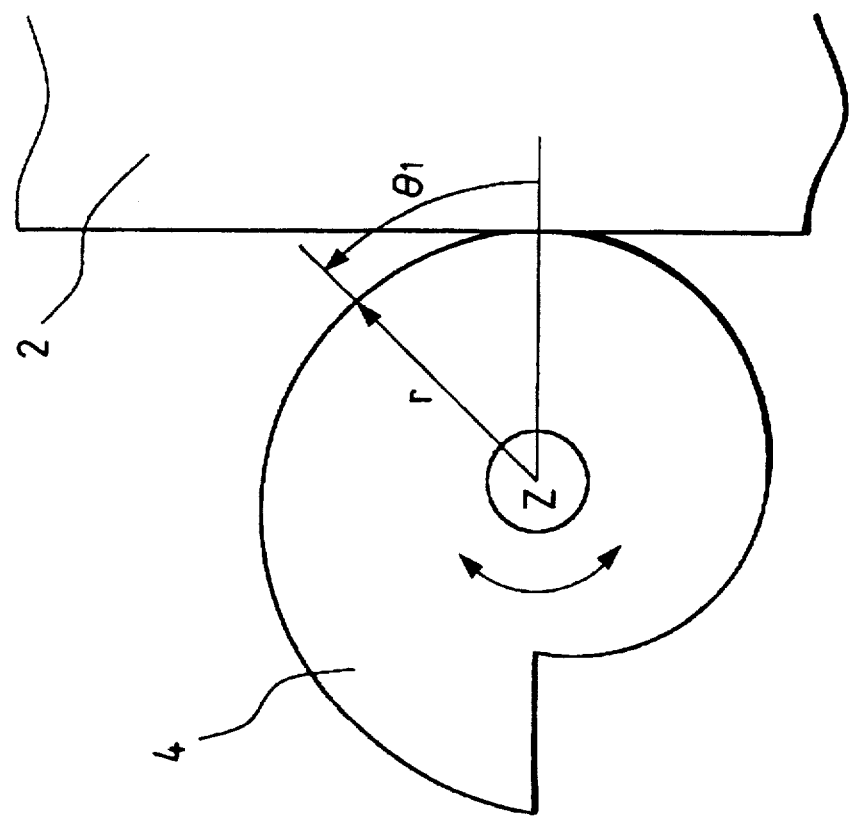

FIGS. 2A and 2B are graphs showing the cam shape of the disc cam 4 and the relation between the angle of rotation and the displacement of the cam. In FIGS. 2A and 2B, when the center of rotation of the disc cam 4 is defined as the Z-axis and with the position of the cam surface contacted by the lens holding member 2 when wobbling is not being effected, that is, when the lens portion 1 is at a reference position, or the angle when the center of action of the cam surface is forwardly and reversely rotated is the reference as $\theta=0$, the cylinder coordinates system $r\theta z$ is taken, the shape of the cam is such a shape that, as is apparent from the characteristic graph thereof, it slightly moves the lens portion 1 back and forth up to a certain range (from $-\theta_1$ to $+\theta_1$) with $\theta=0$ as the center, and greatly moves the lens portion 1 when that range is exceeded. Within the range of use of the cam, the amount of variation in the position (distance) r of the cam surface relative to the angle $\theta$, specifically the shape of this disc-like cam is such a shape that at angles $-\theta a$ to $\theta a$ within a relatively separate range in the range of use of the cam surface, within the range of $-\theta a$ to 0, $$\frac{\partial^2 r}{\partial \theta^2} < 0$$

is satisfied, and within the range of 0 to $\theta a$, $$\frac{\partial^2 r}{\partial \theta^2} > 0$$

is satisfied, and the cam is worked so that the movement distance of the lens portion may become longer away from the center of pivotal movement.

In the construction as described above, when the motor 5 is repetitively rotated in the forward direction and reverse direction, the disc cam 4 connected to the output shaft thereof is likewise rotated. At this time, the lens holding member 2 is urged against the disc cam 4 by the spring 6 and therefore, when the disc cam 4 is rotated and the displacement of the cam surface thereof contacting with the lens holding member 2 varies, the lens holding member 2 moves back and forth in the direction of the optical axis following it, and the lens portion 1 moves back and forth in the direction of the optical axis. In this manner, wobbling is accomplished.

Now, in the present embodiment, by the use of the disc cam of the aforedescribed shape, rotation is controlled up to a maximum angle $\theta_2$ less than one full rotation of the cam when the depth of focus is deep, and it is made possible to effect wobbling at high speed. On the other hand, when the depth of focus is shallow as shown in FIG. 2, use is made of the cam surface in which the amount of displacement of the cam is small ($-\theta_1$ to $\theta_1$) and therefore, even when the amount of movement of the less unit is small, the number of revolutions of the motor does not become so small and the lens unit can be wobbled with good accuracy.

As described above, by the lens moving mechanism of the present embodiment, wobbling can be done at high speed even when the depth of focus is deep and the amount of movement of the lens is great, and moreover, wobbling becomes possible even when the depth of focus is shallow and the amount of movement of the lens is small. Of course, the control of these angles of rotation is effected on the basis of zoom position information which determines the depth of focus, and the aperture value.

Figure 3B:
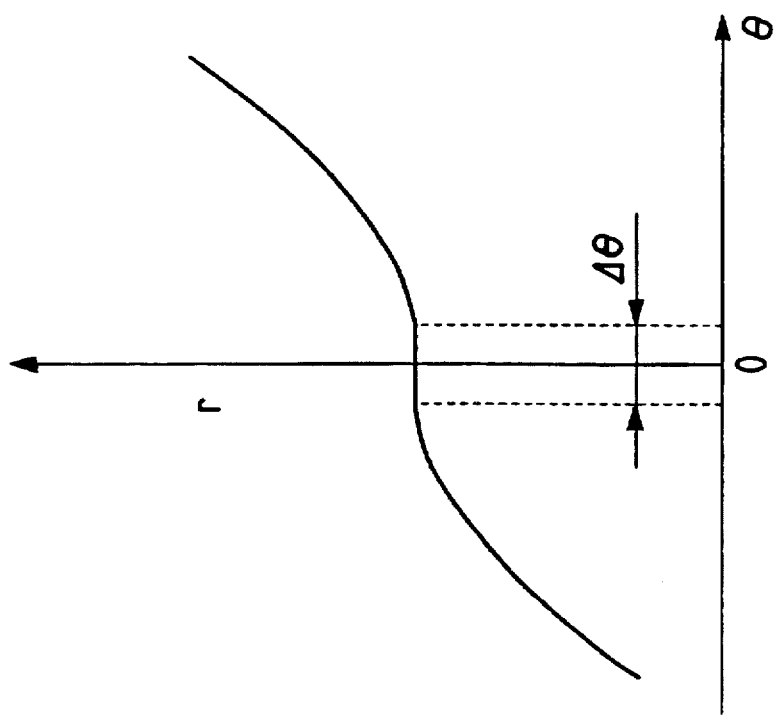
FIGS. 3A and 3B show the shape of a disc-like cam according to the present invention.
Figure 3A:
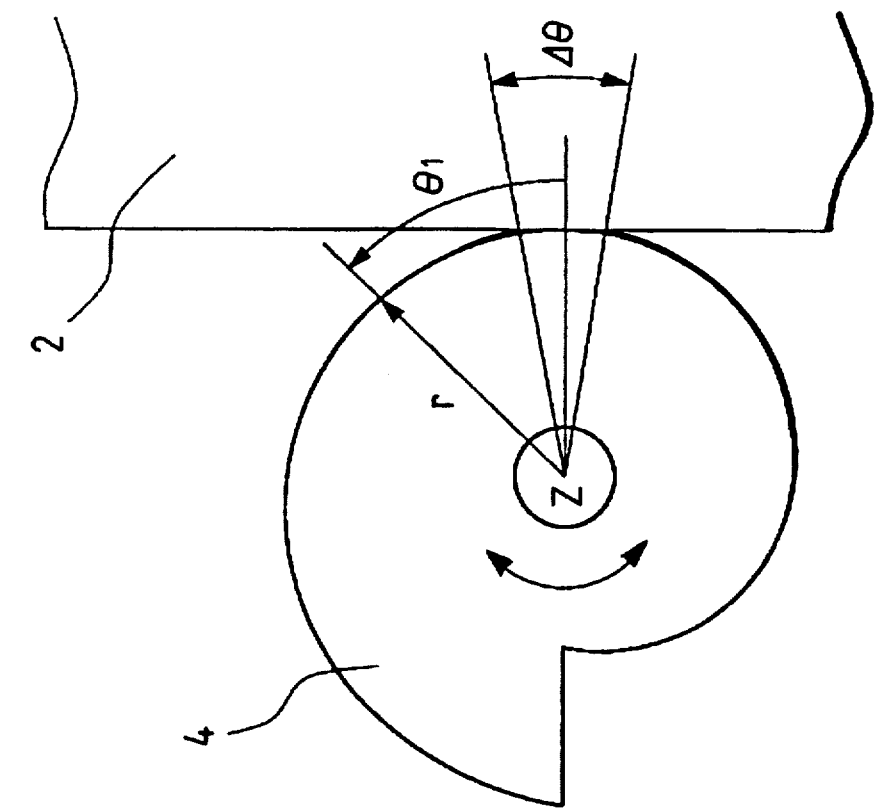

FIGS. 3A and 3B show the cam shape of a disc cam in a second embodiment of the present invention. However, it is to be understood that this embodiment is similar to the first embodiment in the portions other than the disc cam. In FIGS. 3A and 3B, when a cylinder coordinates system $r\theta z$ similar to that of FIGS. 2A and 2B is taken, the disc cam in the present embodiment is characterized in that within the range of a minute angle $\Delta\theta$ in the vicinity of the position of $\theta=0$ corresponding to that when the wobbling lens unit is at the reference position, the distance r between the z-axis and the cam surface is constant and the shape of the cam is set such that within the range of $\Delta\theta$, $$\frac{\partial^2 r}{\partial \theta^2} \simeq 0$$

is satisfied, and within the other ranges, $$\frac{\partial^2 r}{\partial \theta^2} > 0$$

is satisfied.

The present embodiment solves the problem that if the stopped position of the disc cam deviates from the position of $\theta=0$ due to the stop accuracy or the like of the motor when the wobbling operation is not being performed, the wobbling lens unit will move from the reference position and will be out of focus. Again, in the present embodiment, during the wobbling, the motor is rotated so as to rotate the disc cam outside the range of $\Delta\theta$, whereby there is obtained the same effect as that of the first embodiment.

The initial position setting of the cam will now be described.

As previously described, when the motor 5 is driven, the non-linear cam 4 is rotated, and the lens 1 is moved in conformity with the rotation of the cam 4. On the other hand, a reflecting portion 4a for reflecting light is provided on a portion of the cam 4 as shown in FIG. 1B, and the photosensor 10 is fixed so that light emitted from the light emitting portion of the photosensor may be reflected by the reflecting portion 4a and the light may enter the light receiving portion of the photosensor. Design is also made such that when the initial position setting of the lens 1 during the closing of a power source switch is necessary, the motor 5 is driven to thereby rotate the cam 4 and the light of the photosensor 10 is reflected by the reflecting portion 4a and when it arrives at the photosensor 10, the control circuit senses the signal thereof and stops the motor 5. Thus, the non-linear cam is used and a sensor for position setting is provided on a portion of the cam, thereby effecting the minute vibration of the wobbling lens and reliable initial position setting necessary for focus adjustment.

In the foregoing, there have been shown embodiments in which the lens holding member is directly moved and controlled by the cam.

Figure 5A:
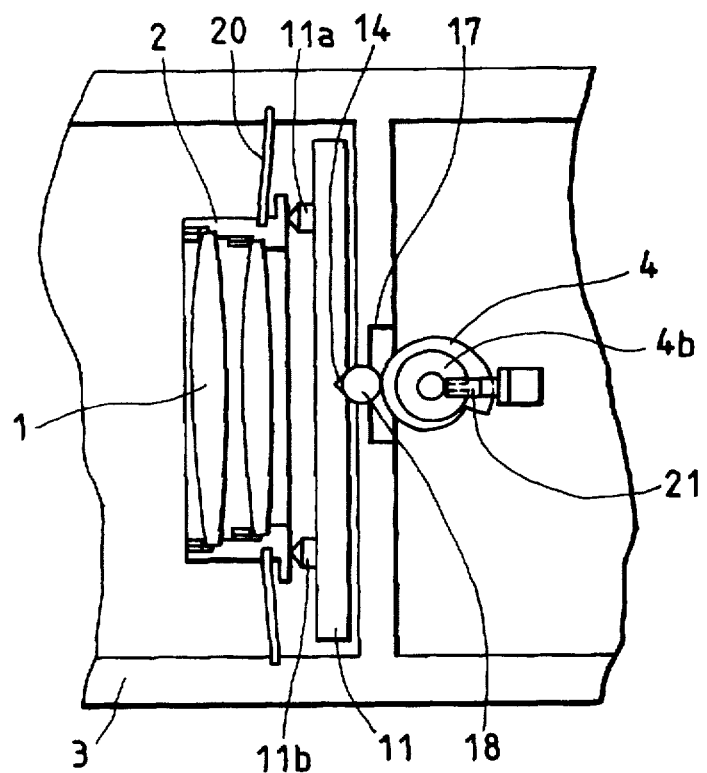
FIGS. 5A and 5B show a second embodiment of the lens moving mechanism according to the present invention.
Figure 5B:
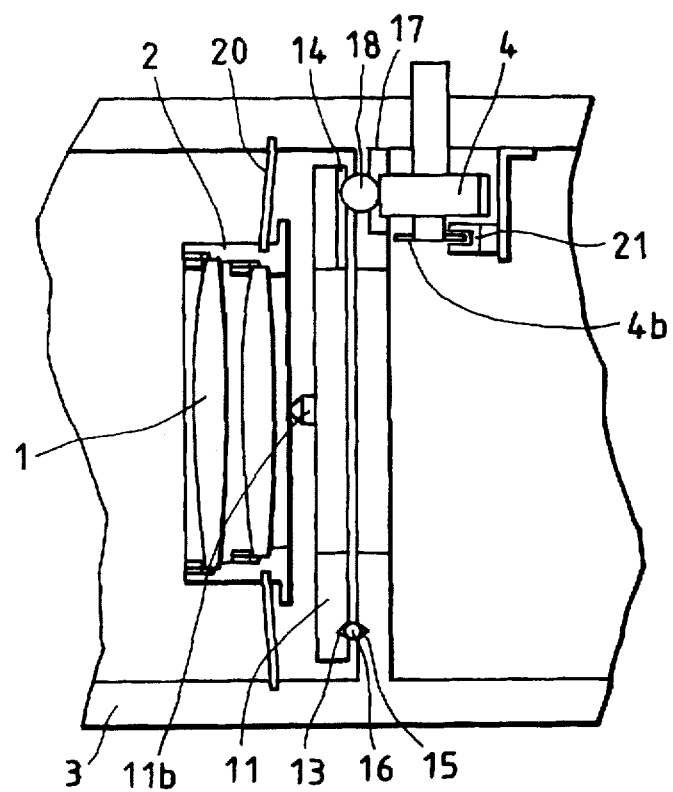
Figure 6:
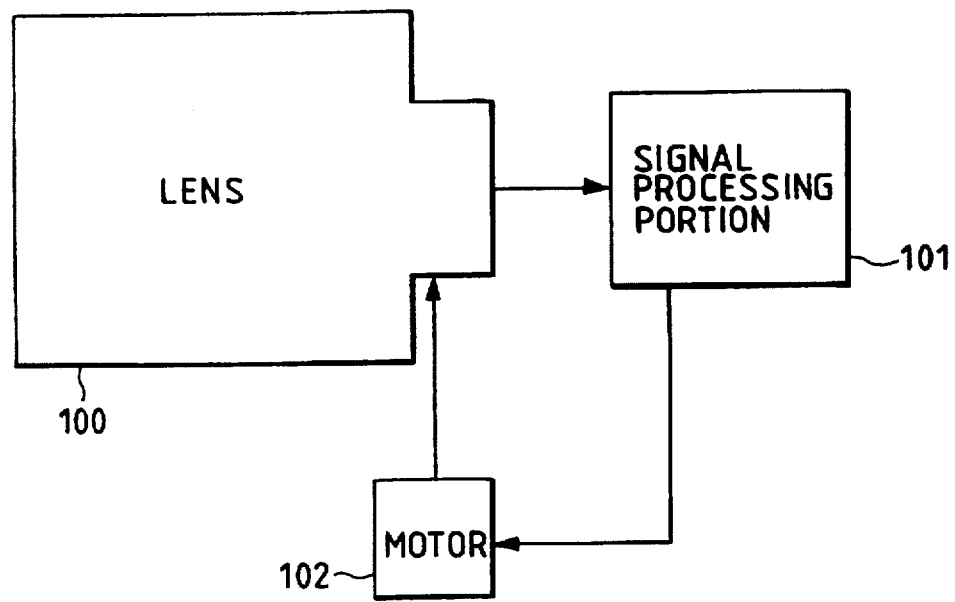
FIG. 6 is a control block diagram of a zoom lens according to the conventional art.
Figure 7:
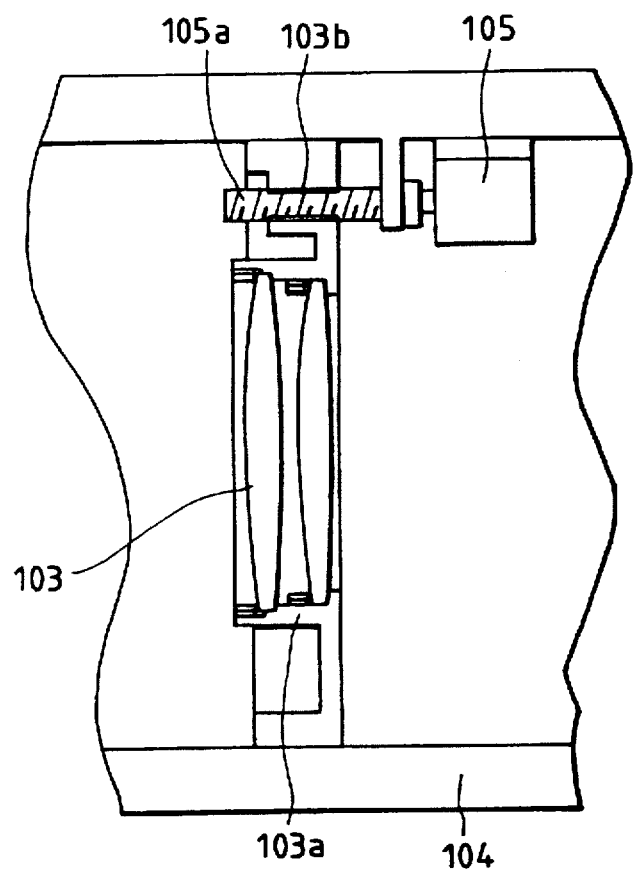
FIG. 7 shows a lens moving mechanism according to the conventional art.

FIGS. 5A and 5B show another embodiment.

In FIGS. 5A and 5B, the reference numeral 1 designates a movable lens unit, the reference numeral 2 denotes a lens holding member holding the movable lens, and the reference numeral 3 designates the fixed portion (fixed barrel) of a lens barrel body. The reference numeral 20 denotes a metallic thin resilient disc with copper as a chief component, and holding the lens holding member 2 in the inner diameter thereof and having its outer diameter fixed to the fixed portion 3. However, the lens holding member 2 and the resilient disc 20 are not rotatable relative to the fixed portion 3. The reference numeral 4 designates a cam similar to that previously described, and rotatable relative to the fixed portion 3. The reference numeral 11 denotes a sling-like plate having pointed-end pin members 11a and 11b mounted on one surface thereof at two positions symmetrical with respect to the center of the optical axis, and having a conical hole 13 and a V-shaped groove 14 formed on the other surface thereof at positions deviated by 90° with respect to the positions of the pin members 11a and 11b. However, it is to be understood that the positions of the conical hole 13 and the V-shaped groove 14 deviate by 180° from each other. Also, the tip ends of the pin members 11a and 11b bear against the end surface of the lens holding member 2. FIG. 5A shows the essential portions when the lens is seen from above it, and FIG. 5B shows the essential portions when the lens is seen from sideways thereof.

A conical hole 15 is formed in that wall surface of the fixed portion 3 which is opposed to the conical hole 13, and a ball member 16 is interposed between the cylindrical holes 13 and 15. Further, a through-aperture 17 is formed in that wall surface of the fixed portion 3 which is opposed to the V-shaped groove 14. A ball member 18 is fitted in the through-aperture 17 so as to protrude to the opposite sides of the through-aperture 17, and one surface of the ball member 18 fits in the V-shaped groove 14 and the other surface of the ball member 18 bears against the cam surface of the cam member 4. The cam member 4 is supported for rotation relative to the fixed portion 3 and is electrically rotatable by a motor or the like.

The reference character 4b designates a disc having a slit and mounted for rotation in synchronism with the cam member 4. The reference numeral 21 denotes a photointerrupter disposed so as to embrace the disc 4b, and such that the slit of the disc 4b passes the photointerrupter 21 when the cam member 4 and the disc 4b are rotated.

In such a construction, when the cam member 4 is electrically rotated, the ball member 18 is pushed by the cam surface and is moved toward the ring-like plate 11 through the through-aperture 17 to push the ring-like plate 11. The plate 11 has its movement in a direction perpendicular to the optical axis regulated by the effects of the ball member 16 interposed between the groove 13 and the conical hole 15 opposed to each other and the ball member 18 fitted in the V-shaped groove 14 and the through-aperture 17 and therefore, it is inclined toward the lens holding member 2 side with the ball member 16 as a fulcrum. Thereupon, the pin member 12 pushes the lens holding member 2, which is thus moved in the direction of the optical axis.

On the other hand, when the cam member 4 is reversely rotated to thereby decrease the displacement of the cam surface bearing against the ball member 18, the lens holding member 2 is moved in a direction opposite to that described above by the resilient force of the resilient disc 20.

Particularly, in this embodiment, the ring-like plate 20 pushing the lens holding member 2 is inclined with the ball member, 16 as a fulcrum and therefore, due to the principle of levers, the ratio between the amount of displacement pushing the holding member 2 at the position of the pin member 12 and the amount of displacement given from the disc cam member 4 to the ring-like plate 11 through the ball member 18 is equal to the ratio between the distance from the ball member 16, which provides the fulcrum, to the pin member 12 and the distance from the ball member 16 to the ball member 18. That is, the amount of displacement of the cam becomes greater by the above-described distance ratio times of the amount of movement of the lens. Thus, there is obtained the effect that when it is desired to move the lens unit by a minute amount, the influence of the working error of the cam becomes small as compared with a case wherein the amount of displacement of the cam and the amount of movement of the lens unit are equal to each other, and the working of the cam becomes easier and the accuracy of the lens position becomes better.

As described above, the design is made such that the disc cam worked so that the amount of variation in the displacement of the cam may increase relative to the direction of rotation is disposed at a right angle with respect to the optical axis of the lens system and the disc cam is rotated so as to move the wobbling lens unit in the direction of the optical axis, whereby even when the depth of focus is deep, wobbling can be accomplished at high speed without the number of revolutions of the motor being remarkably increased and moreover, even when the amount of movement of the lens is small, wobbling can be accomplished with high accuracy.

FIGS. 8A, 8B, 9A and 9B show an embodiment of the present invention. In these figures, the reference numeral 1 designates a movable lens unit, the reference numeral 2 denotes a lens holding member holding the movable lens unit, and the reference numeral 3 designates the fixed portion (fixed barrel) of a lens barrel body. The reference numeral 20 denotes a metallic thin resilient disc with copper as a chief component, held so as to cover the whole of the circumference of the lens holding member 2 and having its outer diameter portion fixed to the fixed portion 3. The lens holding member 2 and the resilient disc 20 are not rotatable relative to the fixed portion 3. The reference numeral 15 designates a cam member having surface cams 15a on the end surface thereof and rotatable relative to the fixed portion 3. The reference numeral 16 denotes an operating ring member connected to the cam member 15 through a pin member 17 and rotatable relative to the fixed portion 3. The reference numeral 18 designates cam follower members provided on the holding member, and two or more such cam follower members are mounted on the lens holding member 2, at positions symmetrical with respect to the center of the optical axis, and bear against the two surface cams of the cam member 15. Here, the cam member is formed of a number of surface cams of the same shape corresponding to the number of the cam follower members 18. Also, the resilient disc 20 is substantially flat in a no-load condition, but is always deformed when it is incorporated into the mechanism of the present embodiment, and is mounted with its resilient force normally creating an urging force between the cam followers 18 and the surface cams of the cam member 15.

In such a construction, when the operating ring 16 is manually rotated or electrically rotated by a motor or the like, the cam member 15 connected thereto by the pin member 17 is also rotated. When the cam member 15 is rotated, the cam followers 18 are pushed out by the surface cams of the cam member 15, as shown in FIG. 8B, and the lens holding member 2 is moved in the direction of the optical axis and the lens unit 1 is likewise moved. The resilient disc, which is formed of a metallic thin film as previously described, may be deformed in the direction of the optical axis, but hardly becomes eccentric relative to a direction perpendicular to the optical axis.

On the other hand, when the operating ring 16 is reversely rotated from the above-described state, the cam member 15 is also reversely rotated and the amount of displacement of the surface cams at the position whereat the cam followers 18 bear decreases. At this time, the lens barrel (lens holding member) 2 is being pushed toward the cam member side by the resilient force of the resilient disc 20 and therefore, the cam followers 18 are moved in accordance with the surface cams, and the lens holding member 2 also fluctuates in a direction opposite to that described above.

By the operating ring 16 being rotated in this manner, the movable lens unit 1 can be moved back and forth in the direction of the optical axis.

Figure 8A:
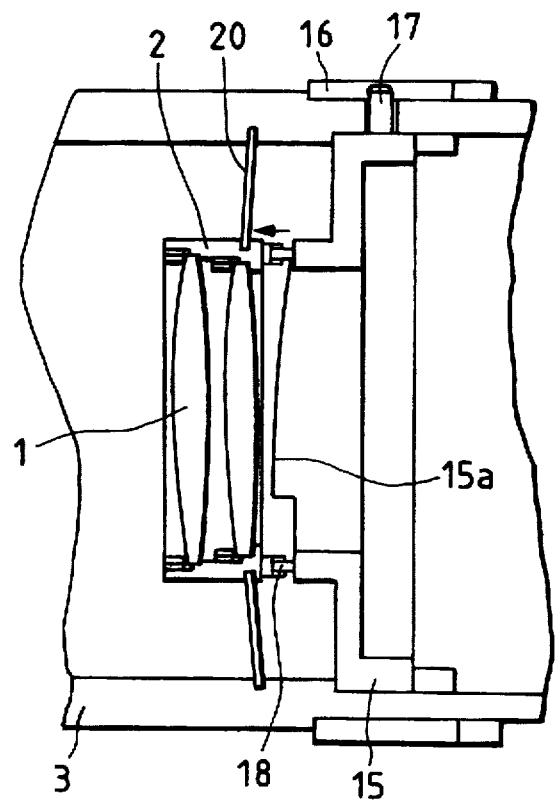
FIGS. 8A and 8B show the moving mechanism according to the present invention.
Figure 8B:
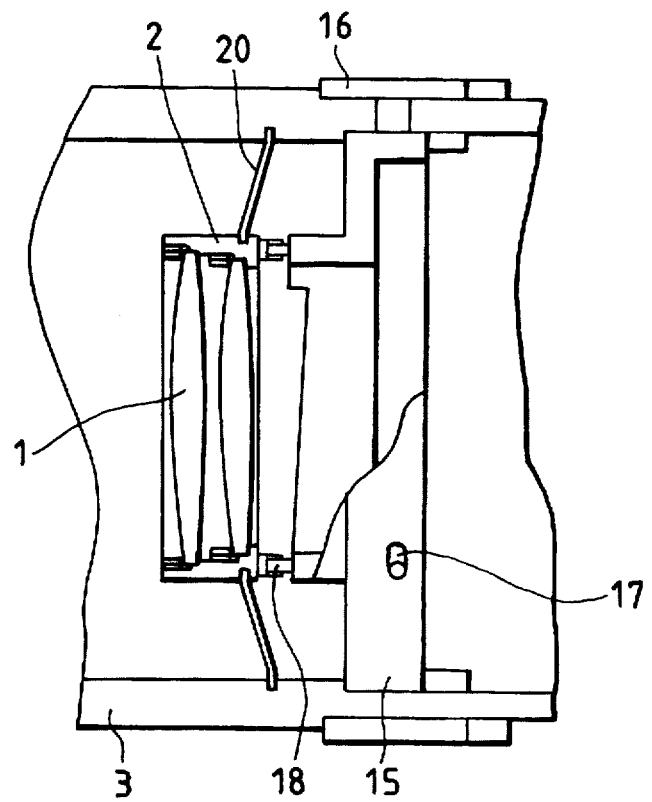
Figure 9A:
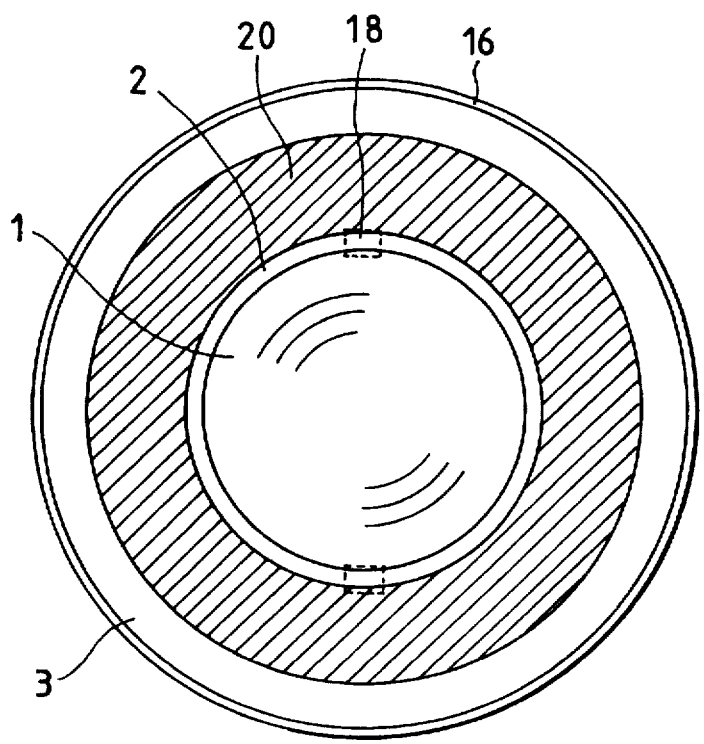
FIGS. 9A and 9B are views of the mechanism shown in FIGS. 8A and 8B as it is seen from the front thereof.
Figure 9B:
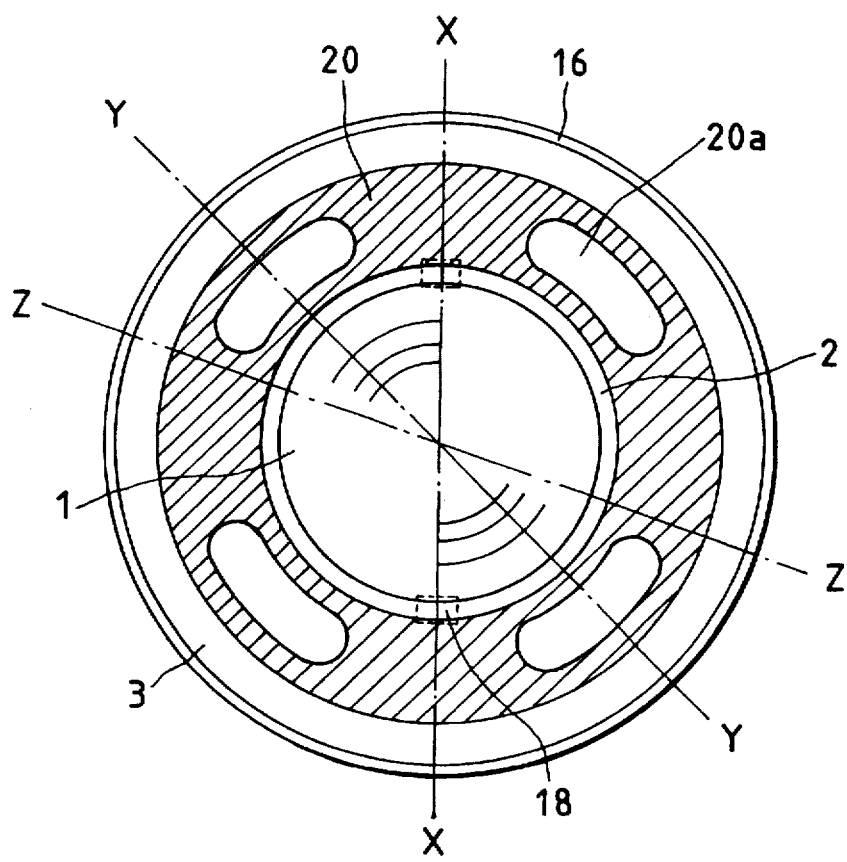

FIGS. 9A and 9B are views of the present embodiment as it is seen from the direction of the optical axis in FIGS. 8A and 8B. The lens holding member 2 is held by the resilient disc as shown in FIGS. 9A and 9B, but the resilient disc is subjected to the force with which the lens holding member is pushed dispersed by the inner diameter thereof, and is deformed into a conical shape. At this time, only a force perpendicular to the surface of the resilient disc is applied and therefore, the center of the disc does not change and it does not happen that the optical axis of the lens unit becomes eccentric. Also, the lens holding member is being pushed by the symmetrically disposed cam followers and therefore is parallel-moved, and no inclination of the optical axis of the lens unit occurs. Further, the present embodiment is simple in structure and therefore, it is possible to make it compact and light in weight and it is also possible to manufacture it inexpensively.

As described above, according to the present embodiment, it becomes possible to realize a compact and light-weight lens moving mechanism, in which the optical axis of the lens unit does not become eccentric and inclined, at low costs.

In the present embodiment, the resilient disc is a doughnut-shaped one as shown in FIG. 9A, but alternatively a resilient disc 20 having one or more through-apertures 20a as shown in FIG. 9B may be used to obtain a similar effect. In this case, however, the shape and positions of the through-apertures 20a in the resilient disc 20 must be in a relation symmetrical with respect to the positions of the cam followers 18 pushing the lens holding member 2 at the center of the optical axis. This is because when the cam followers are at symmetrical position as on line X—X, if the lens holding member 2 is pushed, the resilient disc 20 will be deformed symmetrically as viewed from the cam followers 18 and the lens holding member 2 will move without being inclined, but if the cam followers 18 are at asymmetrical positions as on line Z—Z, the resilient disc 9 will be deformed asymmetrically and therefore, the lens holding member 2 will become inclined.

Also, in the present embodiment, the lens barrel and the resilient disc are constructed as discrete parts, but it can be readily analogized that even if the two are formed integrally with each other, a similar function and effect will be obtained.

Figure 10A:
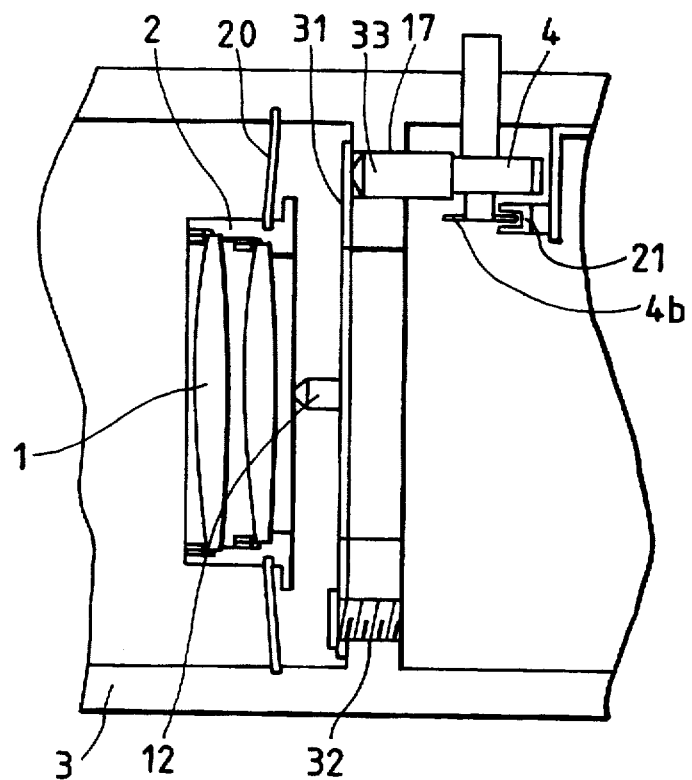
FIGS. 10A and 10B show another lens moving mechanism according to the present invention.
Figure 10B:
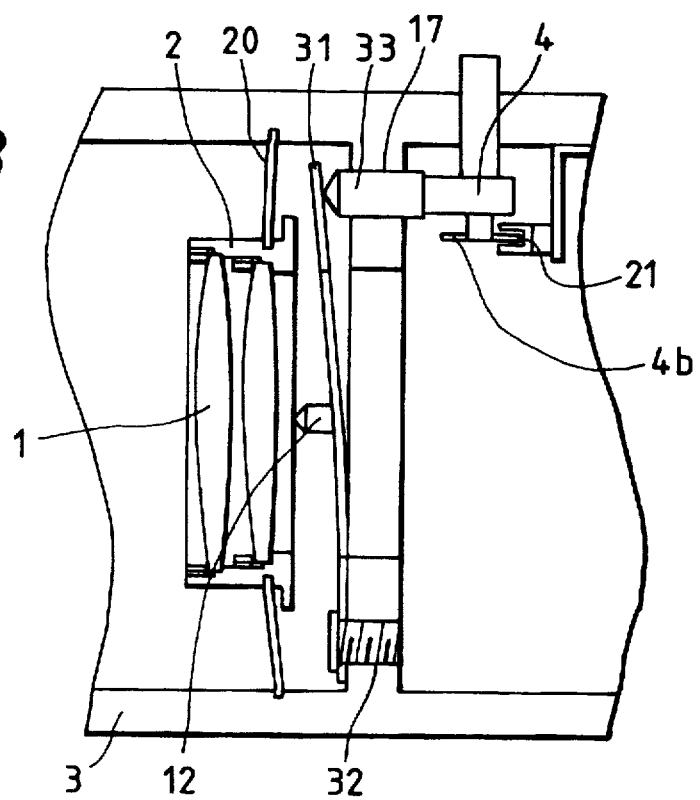

FIGS. 10A and 10B show another embodiment of the present invention. This embodiment is one in which instead of the ring-like plate 11 in the embodiment shown in FIGS. 5A and 5B, a resilient plate 31 is used and the fulcrum is fixed to the fixed portion 3 by a screw 32. However, for the convenience of illustration, the ball member 18 is replaced by a pointed-end pin member 33, but they are the same in their roles. The other members designated by the same reference numerals as those in FIGS. 5A and 5B are similar in construction.

In FIGS. 10A and 10B, when the cam member 4 is rotated, the pin 33 moves along the displacement of the cam and the resilient plate 31 is pushed. When the resilient plate 31 is pushed, the resilient plate 31 is deformed about the fixed portion of the screw 32 and flexure is created, as shown in FIG. 10B. At this time, the pin member 12 mounted on the resilient plate 31 is also pushed out toward the lens holding member 2 side and therefore, the lens unit 1 is moved back and forth in the same manner as in the embodiment of FIGS. 5A and 5B.

The effect of this embodiment is the same as that of the embodiment of FIGS. 5A and 5B, but in this embodiment, the resilient plate 31 is deformed and the amount of displacement thereof is a high-order function of the distance from the fixed portion by the screw 32 and therefore, the ratio of the displacement of the position of the pin member 12 to the displacement given at the position of the cam member 19 becomes smaller than in the embodiment of FIGS. 5A and 5B wherein the amount of displacement becomes a linear function of the distance from the fulcrum. That is, when an attempt is made to move the lens unit by the same amount, if the dimensional relation is the same, the amount of displacement of the cam becomes greater in this embodiment than in the embodiment of FIGS. 5A and 5B. Thus, when the lens unit is finely moved, the working of the cam becomes easy and the effect that the accuracy of the lens position becomes better becomes greater.

Figure 11:
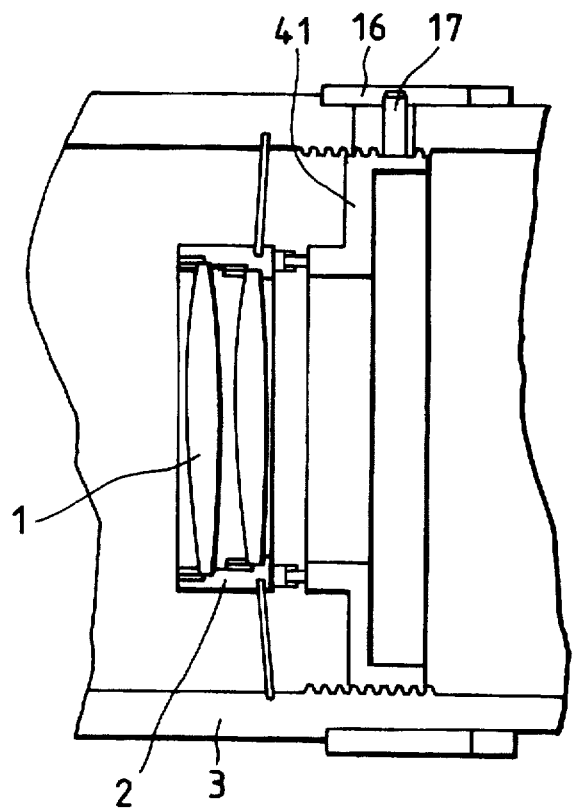
FIG. 11 shows still another lens moving mechanism according to the present invention.
Figure 12:
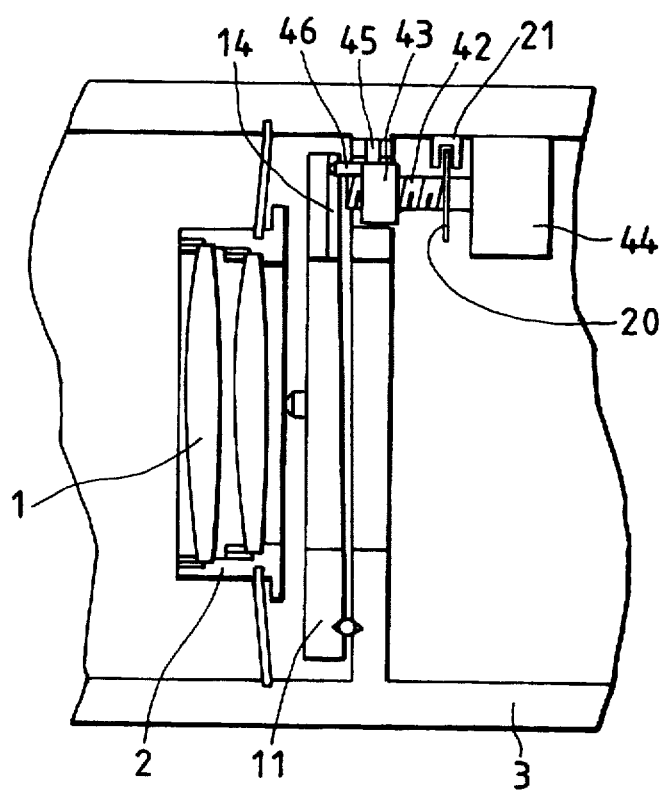
FIG. 12 shows yet still another lens moving mechanism according to the present invention.
Figure 13:
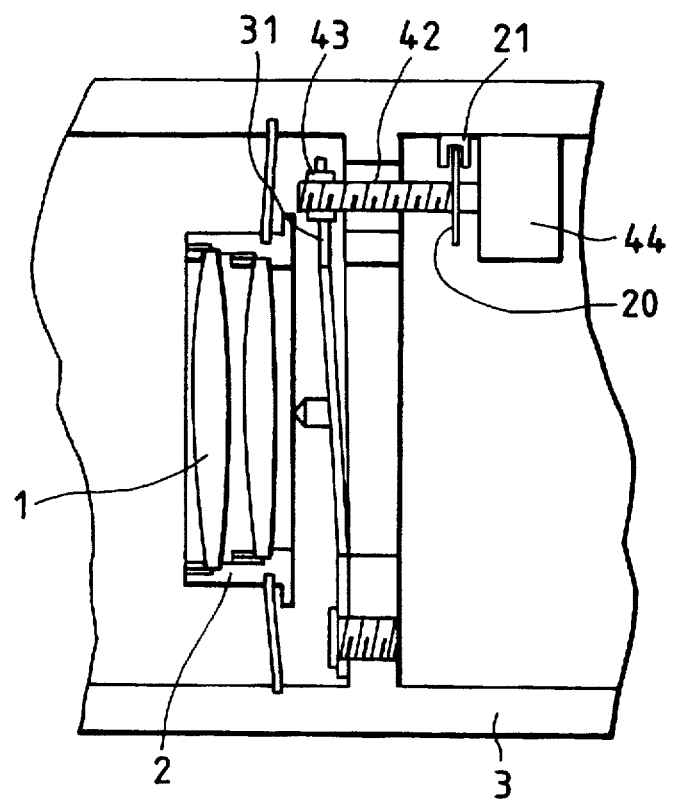
FIG. 13 shows a sixth embodiment of the lens moving mechanism according to the present invention.

FIGS. 11 to 13 show examples in which in each of the previous embodiments, the cam member for moving the lens is replaced by a feed screw.

First, FIG. 11 shows an example in which the cam member 15 of FIGS. 8A and 8B is replaced by a ring member 41 formed with a thread on the outer periphery thereof and is brought into engagement with an internal thread formed on the inner diameter of the fixed portion 3 to thereby constitute a feed screw. In this construction, when the operating ring 16 is rotated, the ring member 41 is rotated through the pin member 17 and by the effect of the feed screw, the ring member 41 is moved in the direction of the optical axis to thereby push the lens barrel 2 and thus, the lens unit 1 is moved.

Next, FIG. 12 shows an example in which in the embodiment of FIGS. 5A and 5B, the cam member is replaced by a feed screw. In FIG. 12, the reference numeral 42 designates a male screw which is the feed screw, and the reference numeral 43 denotes a female screw. The male screw 42 is connected to the output shaft of a motor 44. The reference numeral 45 designates a pin member mounted on the female screw 43 and fitted in a slot formed in the fixed portion 3 and not rotatable from the interval thread 43 but axially rectilinearly movable. The reference numeral 46 denotes a pointed-end pin member mounted on the female screw 43 and fitted in a V-shaped groove 14 in the ring-like plate 11 to push the ring-like plate 11. In this construction, when the male screw 42 is rotated, the female screw 43 is rectilinearly moved and the ring-like plate 11 is pushed and thus, the lens unit 1 is moved.

FIG. 13 shows an example in which the cam member of FIGS. 10A and 10B is replaced by a feed screw, and in this example, a female screw 43 is constructed integrally with a resilient plate 31. Thus, when a male screw 42 is rotated, displacement is directly given to the resilient plate 31, and as in the third embodiment, the lens unit 1 can be moved.

As described above, even if the cam member for moving the lens is replaced by a feed screw, the lens unit can be likewise moved and the same effect can be obtained.

Figure 14:
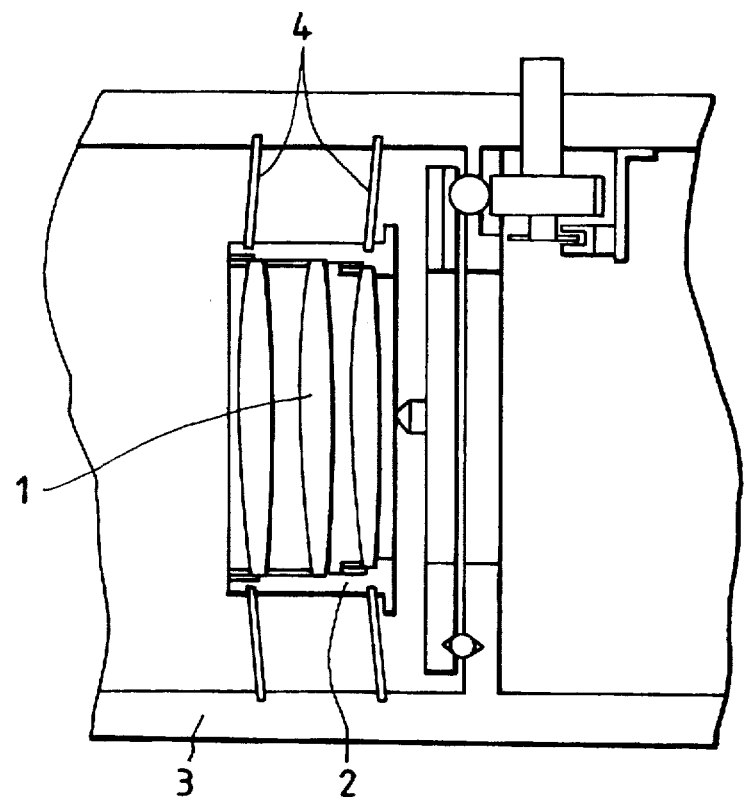
FIG. 14 shows the holding structure for a further form of the lens moving mechanism according to the present invention.

FIG. 14 shows an embodiment in which a plurality of resilient discs 4 for holding the lens barrel 2 are used. This embodiment solves the problem that when the lens barrel 2 is held by a resilient disc 4, the position of the hold lens barrel 2 is liable to become unstable when the weight of the movable lens unit 1 or the lens barrel 2 is heavy or when the full length of the movable lens unit 1 in the direction of the optical axis is great. This also holds true of the afore-described other embodiments.

Figure 15A:
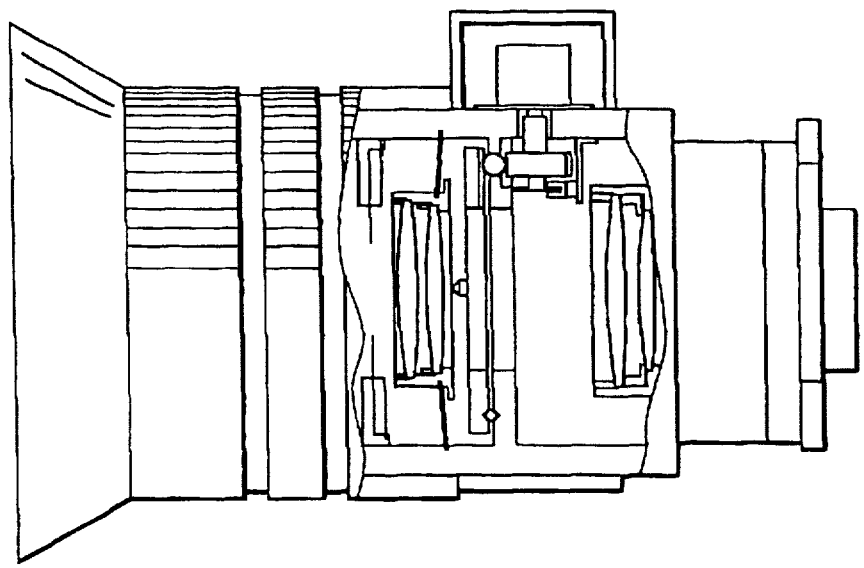
FIGS. 15A and 15B show the lens moving mechanism according to the present invention as it is carried on a camera.
Figure 15B:
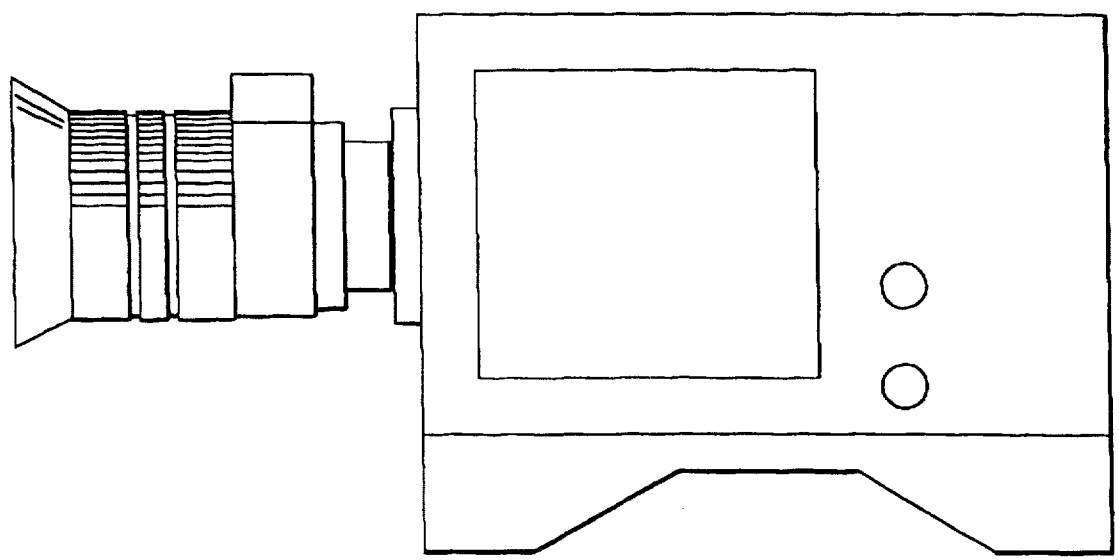
Figure 17A:
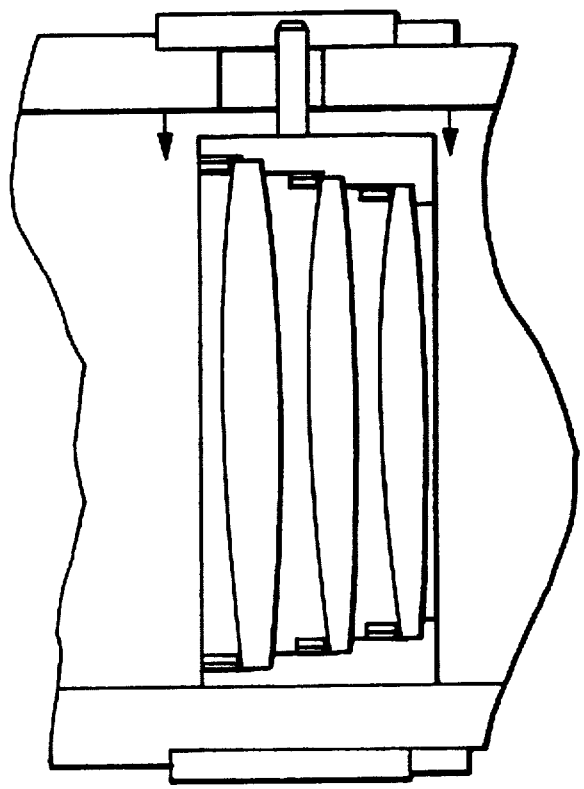
FIGS. 17A and 17B show a lens moving mechanism according to the conventional art.
Figure 17B:
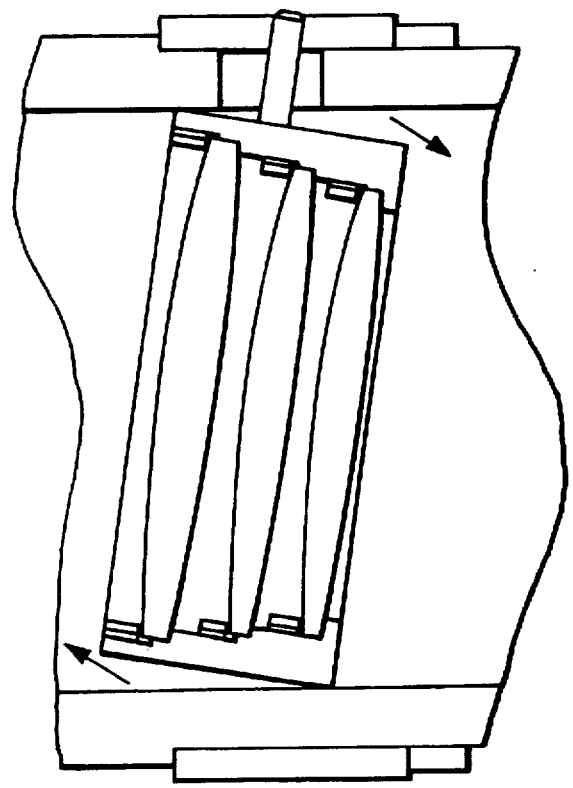

FIGS. 15A and 15B show an example in which the lens moving mechanism according to the present invention is carried on a photographing lens device and is utilized in an apparatus wherein a lens unit is finely moved in the direction of the optical axis thereof to thereby effect focus detection. FIG. 15B shows an example in which a photographing lens device carrying thereon the lens moving mechanism according to the present invention is mounted on a camera.

As described above, the lens moving mechanism of the present invention is suitable for use in the focus detecting device of a lens device with the automatic focus adjusting function as described above, and thereby, it becomes possible to realize a lens device with a very highly accurate and high-speed automatic focus adjusting function.

What is claimed is:

1. A lens moving mechanism for finely moving at least a lens portion of an objective lens in a direction of an optical axis of the objective lens, said lens moving mechanism comprising:

a holding member holding the lens portion; and a disc-like disc cam member provided with a cam surface, which lies in a peripheral portion of said disc-like disc cam member, said disc cam member being rotated to thereby move said holding member on a track conforming to said cam surface, wherein when the angle of rotation is zero, the center of action of the forwardly and reversely rotated cam surface of said disc cam member is the reference, the angle of the cam surface within a certain range of use thereof is $\theta a$ and the distance from the center of an axis of rotation to the cam surface is r, such that in the range of $-\theta a$ to 0, $$\frac{\partial^2 r}{\partial \theta^2} < 0$$

is satisfied, and in the range of 0 to $\theta a$, $$\frac{\partial^2 r}{\partial \theta^2} > 0$$

is satisfied.

2. The lens moving mechanism of claim 1, wherein said disc cam member repeats forward rotation and reverse rotation about a predetermined axis of rotation and is rotatively controlled, and said cam surface has a shape in which the distance from the predetermined axis becomes gradually longer or shorter.

3. The lens moving mechanism of claim 1, wherein said holding member is held relative to an outer cylinder by a disc-like resilient member.

4. The lens moving mechanism of claim 3, wherein said resilient member is a metallic thin plate.

5. A lens driving apparatus for detecting a focus state, said apparatus comprising:

a lens barrel;

an objective lens comprising a plurality of lens units, said objective lens having an optical axis; and a rotating member rotating about a predetermined axis of rotation to finely move a lens unit of said plurality of lens units of said objective lens in a direction of the optical axis, said lens unit being connected to said lens barrel by a disk-like resilient member, and said rotating member having a peripheral surface such that a distance from the predetermined axis of rotation to the peripheral surface is gradually changed, wherein said lens unit is moved forwardly or backwardly in a direction of the optical axis of said objective lens according to rotation of the peripheral surface, and wherein said rotating member is configured to repeat forward rotation and reverse rotation about the predetermined axis of rotation for detection of a focus condition.

6. An apparatus according to claim 5, further comprising a motor connected to the predetermined axis of rotation of said rotating member.

7. An apparatus according to claim 6, further comprising a control circuit for controlling focus detection, to repeat the forward rotation and reverse rotation.

8. An apparatus according to claim 5, further comprising a ring-shaped member having a plurality of bearing portions bearing against said lens unit, said ring-shaped member being inclined by said rotating member with respect to a fulcrum, so that said lens unit is driven in an optical direction by said bearing portions.

* * * * *

UNITED STATES PATENT AND TRADEMARK OFFICE
CERTIFICATE OF CORRECTION

PATENT NO.    : 5,912,774

DATED         : June 15, 1999

INVENTOR(S)   : Setsuo YOSHIDA, et al.

It is certified that error appears in the above-identified patent and that said Letters Patent is hereby corrected as shown below:

COLUMN 6:

Line 8, "less unit" should read --lens unit--.
Line 23, the right margin should be closed up.
Line 24, the left margin should be closed up, and "In" should begin a new paragraph.

COLUMN 9:

Line 60, "position as on" should read --positions on one--.

Signed and Sealed this

Fourteenth Day of November, 2000

Attest:

Q. TODD DICKINSON

*Attesting Officer*     *Director of Patents and Trademarks*